(12) United States Patent
Elie et al.

(10) Patent No.: US 9,783,027 B1
(45) Date of Patent: Oct. 10, 2017

(54) VEHICLE DOOR ASSIST ASSEMBLY INCORPORATING A HIGH TORQUE OPERATING MECHANISM

(71) Applicant: Ford Global Technologies, LLC, Dearborn, MI (US)

(72) Inventors: Larry Dean Elie, Ypsilanti, MI (US); Timothy J. Potter, Dearborn, MI (US); John Wayne Jaranson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/096,592

(22) Filed: Apr. 12, 2016

(51) Int. Cl.
*B60J 5/00* (2006.01)
*B60J 5/04* (2006.01)

(52) U.S. Cl.
CPC .................. *B60J 5/0473* (2013.01)

(58) Field of Classification Search
CPC ............ B65H 2511/12; B65H 2511/22; B65H 2220/01; B65H 2220/04; B65H 2220/11; Y10T 292/1082; E05B 81/25; E05B 55/00; E05Y 2900/132; E05Y 2201/434
USPC .......................... 296/146.11; 292/201, 39, 51
See application file for complete search history.

(56) References Cited

U.S. PATENT DOCUMENTS

| 4,045,914 | A | * | 9/1977 | Catlett | ................... | E05F 1/1207 |
| | | | | | | 49/334 |
| 4,706,512 | A | * | 11/1987 | McKernon | .............. | E05B 81/25 |
| | | | | | | 292/336.3 |
| 5,088,347 | A | * | 2/1992 | Wanlass | ................... | E05B 81/25 |
| | | | | | | 192/84.951 |
| 5,214,332 | A | * | 5/1993 | Tsutsumi | ................ | E05B 81/25 |
| | | | | | | 292/336.3 |
| 5,221,239 | A | * | 6/1993 | Catlett | ................... | E05F 15/614 |
| | | | | | | 475/342 |
| 5,913,763 | A | * | 6/1999 | Beran | ...................... | E05F 1/105 |
| | | | | | | 49/26 |
| 6,002,217 | A | * | 12/1999 | Stevens | ................. | E05F 15/611 |
| | | | | | | 318/9 |
| 6,076,870 | A | * | 6/2000 | Frolov | ................ | E05B 47/0047 |
| | | | | | | 292/144 |
| 6,100,619 | A | | 8/2000 | Buscher et al. | | |
| 6,183,039 | B1 | * | 2/2001 | Kohut | ................. | E05D 15/1081 |
| | | | | | | 296/146.12 |
| 6,237,737 | B1 | * | 5/2001 | Jorgensen | ............. | F16D 27/118 |
| | | | | | | 192/84.92 |
| 6,629,905 | B1 | | 10/2003 | Sesselmann et al. | | |
| 7,017,882 | B2 | | 3/2006 | Marsh et al. | | |
| 7,975,984 | B1 | | 7/2011 | Novruzov et al. | | |
| 8,024,090 | B2 | | 9/2011 | Imamura | | |
| 8,407,937 | B2 | * | 4/2013 | Houser | ................... | E05F 15/63 |
| | | | | | | 49/139 |
| 8,474,888 | B2 | * | 7/2013 | Tomaszewski | ......... | E05B 77/26 |
| | | | | | | 292/201 |

(Continued)

*Primary Examiner* — Kiran B Patel
(74) *Attorney, Agent, or Firm* — Jason Rogers; Price Heneveld LLP

(57) ABSTRACT

A vehicle includes a door frame coupled to a vehicle frame at a hinge. A door operating mechanism is coupled to the door and vehicle frames for applying rotational force to the door frame about the hinge. The door operating mechanism including external cogs of an inner gear that mesh with inner cogs of an outer gear and a single oblong bearing that biases the inner gear in partial engagement with the outer gear.

7 Claims, 7 Drawing Sheets

(56) References Cited

U.S. PATENT DOCUMENTS

| | | | |
|---|---|---|---|
| 8,720,113 B1* | 5/2014 | Krivoy | E05F 15/63 49/339 |
| 9,233,752 B2 | 1/2016 | Walitzki et al. | |
| 9,534,587 B2* | 1/2017 | Tostado | F03G 1/00 |
| 2006/0135305 A1 | 6/2006 | Erez et al. | |
| 2008/0313966 A1 | 12/2008 | Sielhorst | |
| 2015/0013132 A1 | 1/2015 | Wang | |
| 2015/0247563 A1* | 9/2015 | Yeh | F16H 49/001 74/457 |
| 2017/0030133 A1* | 2/2017 | Elie | E05F 15/70 |
| 2017/0030137 A1* | 2/2017 | Elie | E05F 15/77 |
| 2017/0074020 A1* | 3/2017 | Azzouz | E05F 15/611 |

* cited by examiner

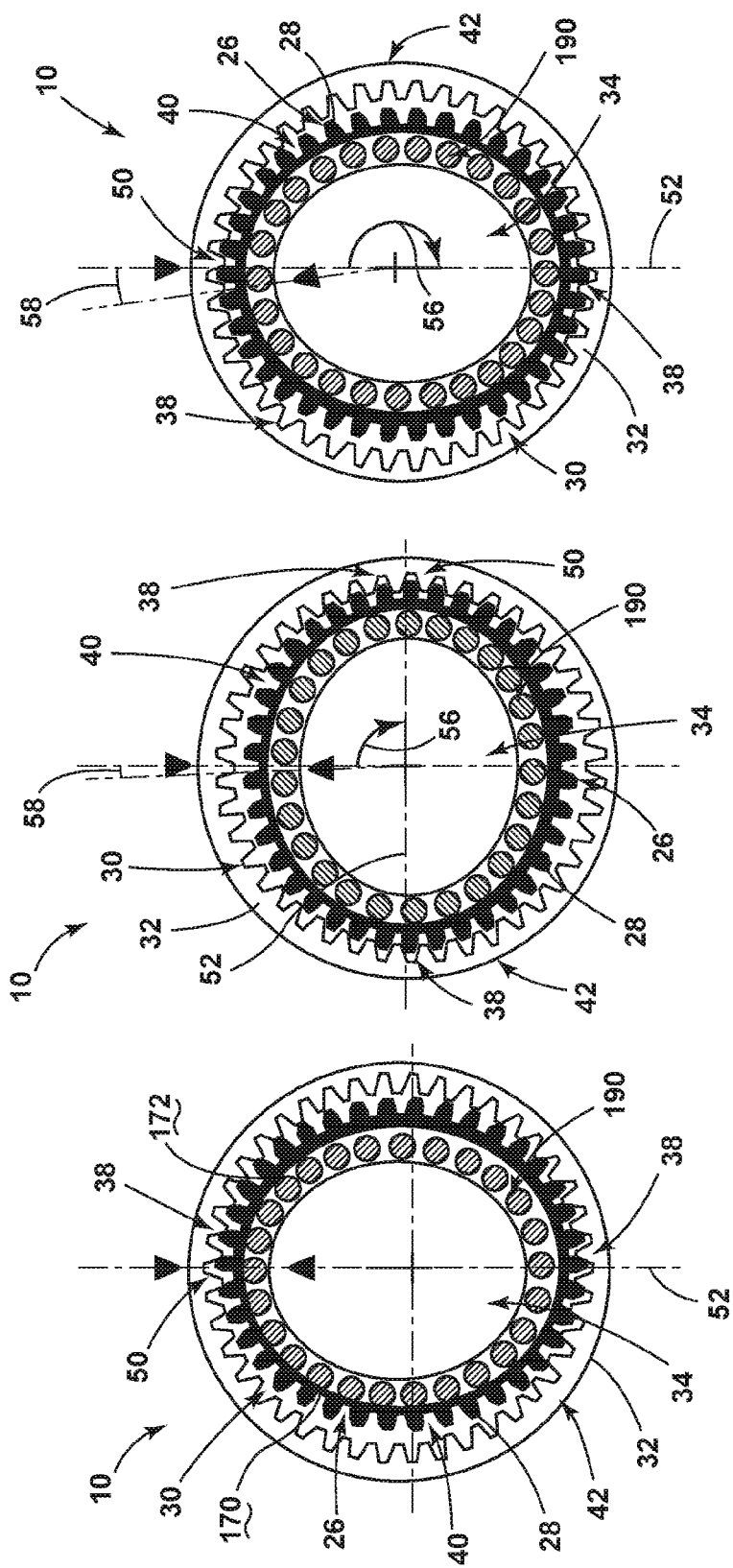

VEHICLE DOOR ASSIST ASSEMBLY INCORPORATING A HIGH TORQUE OPERATING MECHANISM

FIELD OF THE INVENTION

The present invention generally relates to vehicle doors, and more specifically, an automatic door operating mechanism having a high-torque drive.

BACKGROUND OF THE INVENTION

Various automobiles include doors that incorporate door-assist mechanisms that are used to open, close, or otherwise assist the user in operating any one or more of the doors of the vehicle. Such operating mechanisms typically include motors that assist in rotating a door or stop the rotation of a door upon the needs of the user.

SUMMARY OF THE INVENTION

According to one aspect of the present invention, a vehicle includes a door frame coupled to a vehicle frame at a hinge. A door operating mechanism is coupled to the door and vehicle frames for applying rotational force to the door frame about the hinge. The door operating mechanism including external cogs of an inner gear that mesh with inner cogs of an outer gear and a single oblong bearing that biases the inner gear in partial engagement with the outer gear.

According to another aspect of the present invention, a door operating mechanism for operating a vehicle door includes a motor coupled to a gear-reduction interface having an oblong bearing that slidably rotates within a flexible spline that operates in a meshing engagement within a circular spline. A hinge plate is in communication with the flexible spline, wherein the motor operates the oblong bearing to deliver a rotational force of the motor to the hinge plate via the gear-reduction interface.

According to another aspect of the present invention, a hinge assembly for a vehicle door includes a motor coupled to a door frame and adapted to apply a rotational force thereto relative to a vehicle frame. An oblong bearing is rotationally coupled to the motor. A flexible inner gear has an interior surface that receives at least a portion of the oblong bearing. A rigid outer gear has inner cogs that mesh with external cogs of the flexible inner gear. Rotation of the oblong bearing meshes the external cogs with the inner cogs resulting in rotation of the flexible inner gear relative to the rigid outer gear. The flexible inner gear is coupled with a hinge plate that is attached to the vehicle frame.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a schematic cross-sectional view of an aspect of a gearing mechanism for the door operating mechanism illustrating the gearing mechanism at a start position;

FIG. 5 is a schematic cross-sectional view of the gearing mechanism of FIG. 4 illustrating the rotation of the gearing mechanism 90 degrees from the start position;

FIG. 6 is a schematic cross-sectional view of the gearing mechanism of FIG. 4 illustrating a 180 degree rotation of the gearing mechanism from the start position;

DETAILED DESCRIPTION OF THE PREFERRED EMBODIMENTS

Figure 1:
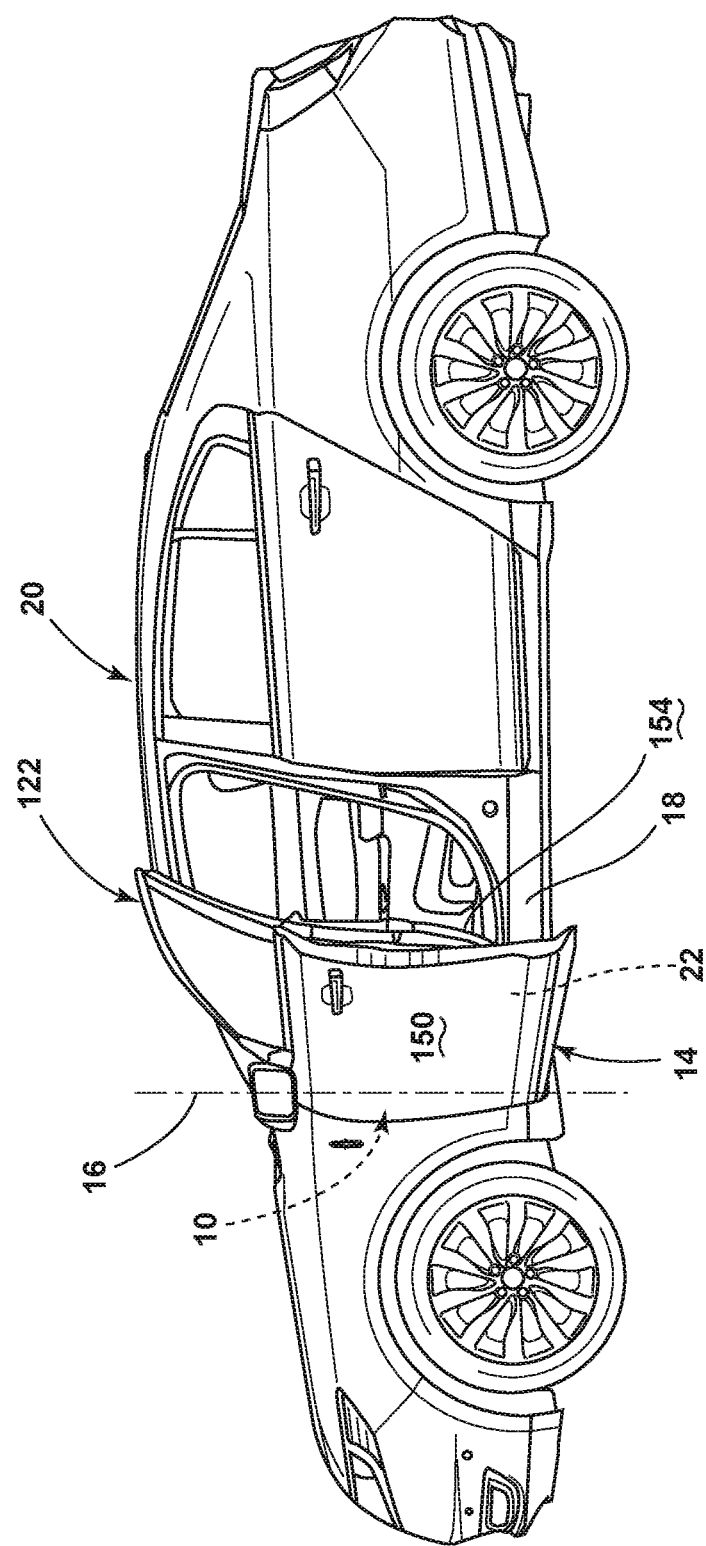
FIG. 1 is a side perspective view of a vehicle incorporating an aspect of the door operating mechanism and illustrating the door in the open position.
Figure 2:
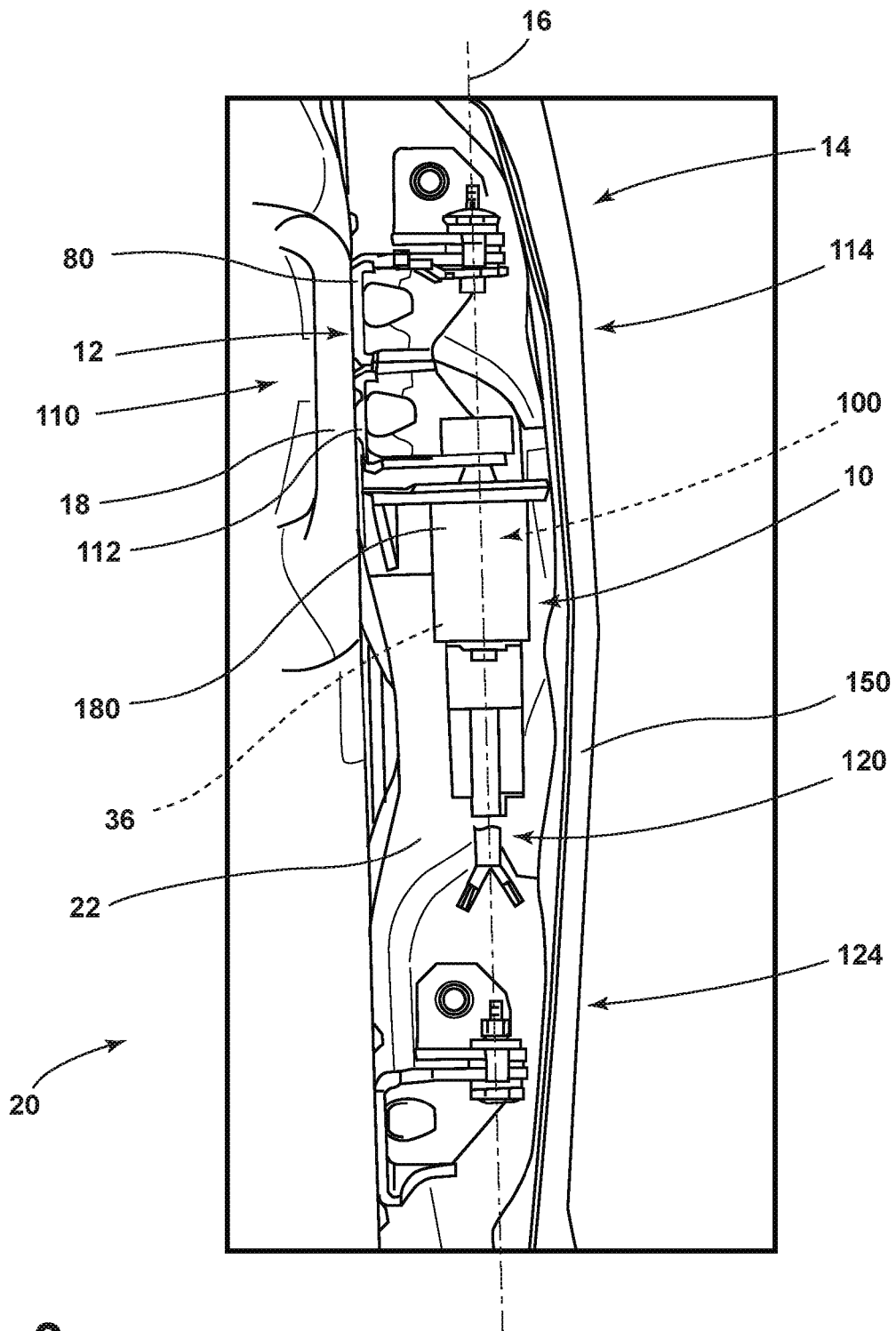
FIG. 2 is a cross-sectional view of a door and vehicle frame incorporating an aspect of the door operating mechanism within a cavity of the door.
Figure 3:
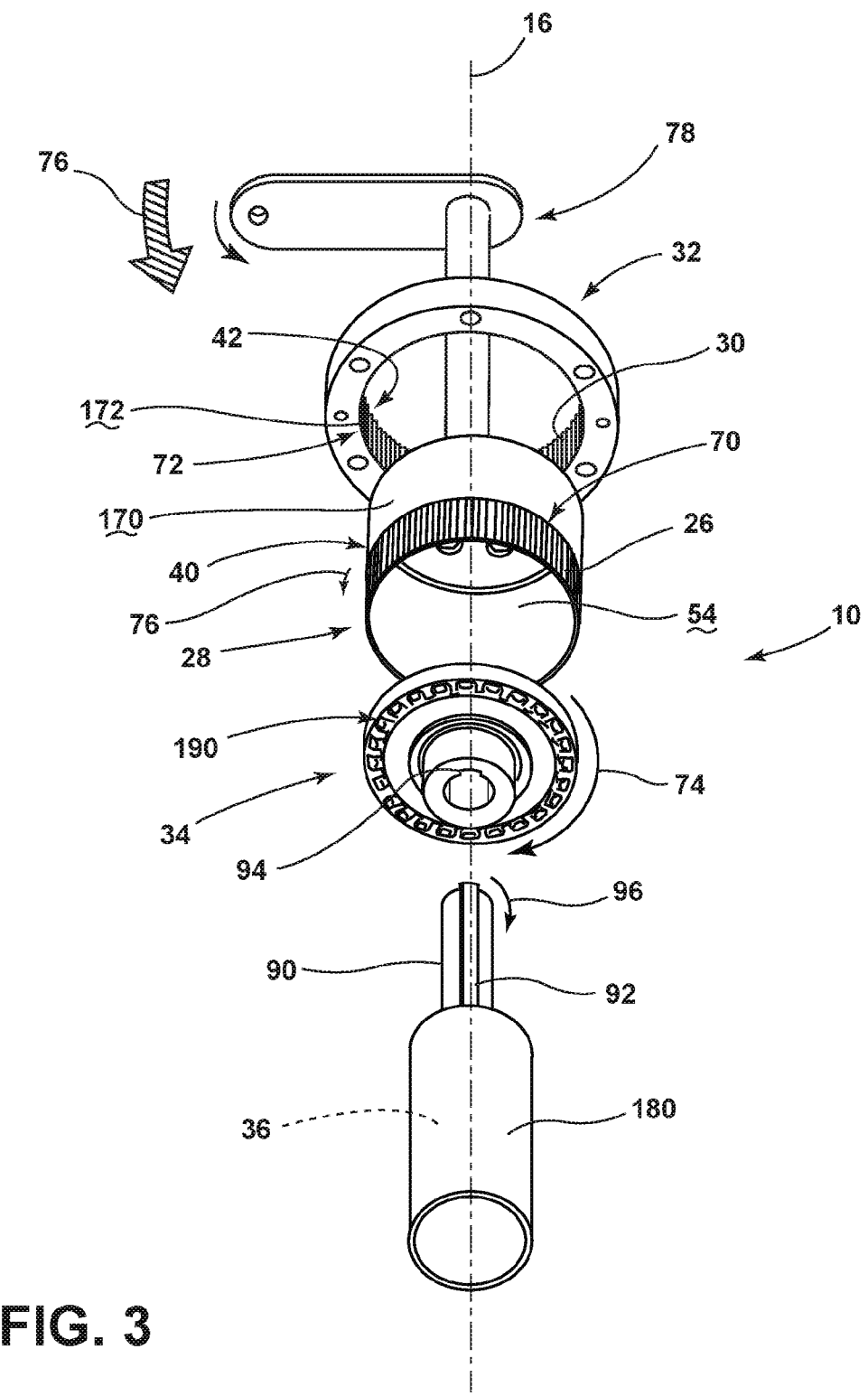
FIG. 3 is a partially exploded view of an aspect of the door operating mechanism.
Figure 7:
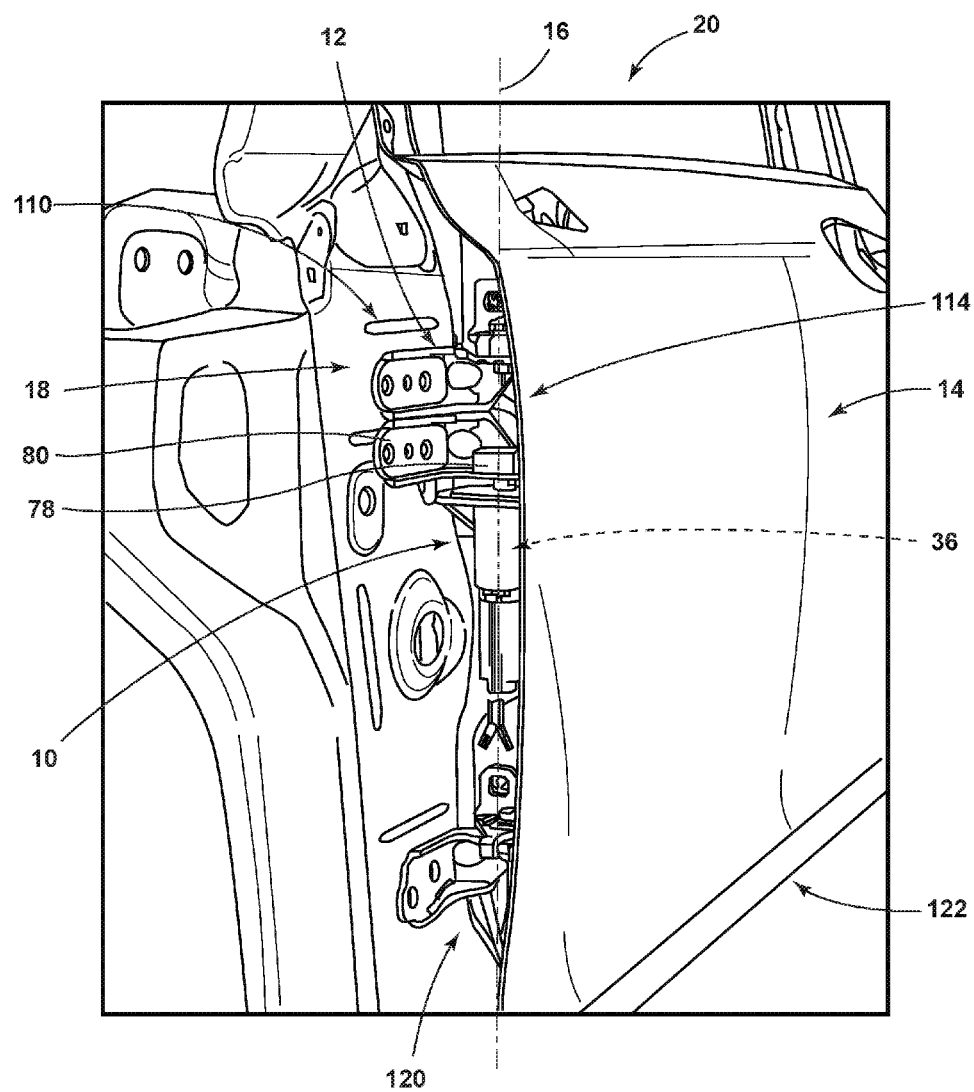
FIG. 7 is a perspective cross-sectional view of the vehicle door of FIG. 4.
Figure 8:
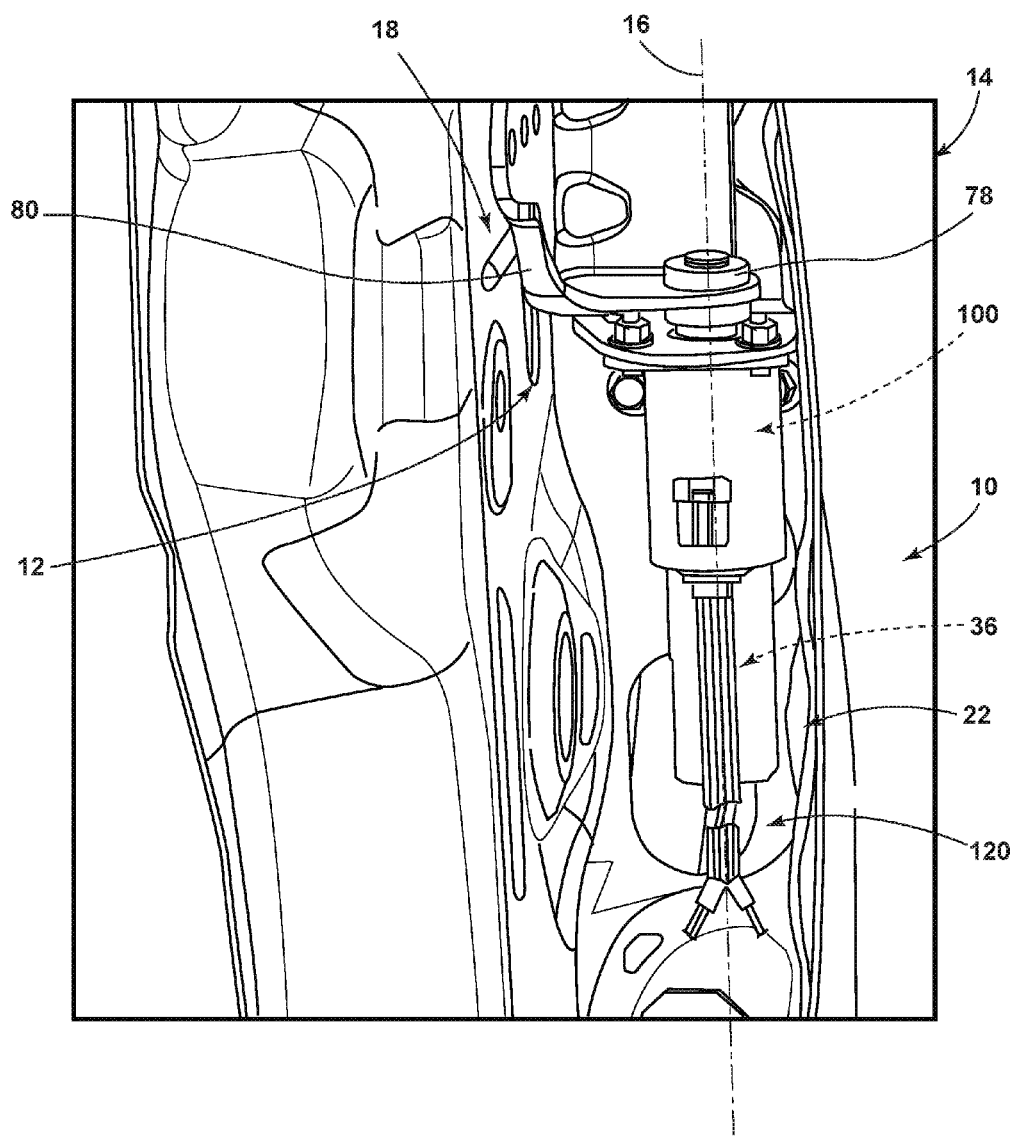
FIG. 8 is a perspective cross-sectional view of a vehicle door incorporating an aspect of the door operating mechanism engaged with a vehicle frame.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a door operating mechanism attached to a hinge 12 for operating a vehicle door 14 about a vertical axis 16 relative to a vehicle frame 18, according to at least one embodiment. The vehicle 20 can include a door frame 22 that is coupled to the vehicle frame 18 at the hinge 12. The door operating mechanism 10 is coupled to the door frame 22 and the vehicle frame 18 for applying rotational force 24 to the door frame 22 about the hinge 12. It is contemplated that the door operating mechanism 10 includes external cogs 26 of an inner gear 28 that mesh with inner cogs 30 of an outer gear 32, and a single oblong bearing 34 that biases the inner gear 28 into partial engagement with the outer gear 32. As the oblong bearing 34 is rotated by a motor 36 of the door operating mechanism 10, the oblong bearing 34 deforms the inner gear 28 to bias different meshing portions 38 of the inner gear 28 into partial engagement with the outer gear 32. In this manner, at least two meshing portions 38 of the inner gear 28 are always in engagement with the outer gear 32, where these meshing portions 38 continuously change during operation of the oblong bearing 34. It is contemplated that the external cogs 26 of the inner gear 28 define a flexible spline 40 and the inner cogs 28 of the outer gear 32 define a rigid circular spline 42.

Referring again to FIGS. 1-6, the oblong bearing 34 can include opposing engaging portions 50 that define a major axis 52 of the oblong bearing 34. In such an embodiment, the engaging portions 50 of the oblong bearing 34 engage an interior surface 54 of the inner gear 28. In this manner, engagement of the engaging portions 50 of the oblong bearing 34 with the interior surface 54 of the inner gear 28 outwardly deflects corresponding meshing portions 38 of the flexible spline 40 into engagement with the rigid circular spline 42. Accordingly, the oblong bearing 34 slidably rotates within the inner gear 28 at a first rotational speed 56. Operation of the oblong bearing 34 at the first rotational speed 56 serves to rotate the inner gear 28 at a different and slower second rotational speed 58 of the inner gear 28 having the flexible spline 40 that meshes within the outer gear 32. The outer gear 32 is defined by the rigid circular spline 42 and a meshing engagement between the external cogs 26 and the inner cogs 30 results from the engagement of the inner and outer gears 28, 32.

Referring now to FIGS. 3-6, the external cogs 26 of the inner gear 28 include a first set of cogs 70. The inner cogs 30 of the outer gear 32 define a second set of cogs 72, wherein the second set of cogs 72 outnumber the first set of cogs 70. Typically, the number of cogs in the second set of cogs 72 will only slightly outnumber the number of cogs in the first set of cogs 70. In this manner, a single rotation of the oblong bearing 34 serves to rotate the inner gear 28 only a minimal distance relative to the outer gear 32. This minimal rotational movement 74 of the inner gear 28 relative to the outer gear 32 serves to deliver a high amount of torque 76 based upon the much greater rotational movement 74 of the oblong bearing 34. Accordingly, a single rotation of the inner gear 28 within the outer gear 32 can be produced by a predetermined number of rotations of the oblong bearing 34 within the inner gear 28. By way of example, and not limitation, the predetermined number of rotations can be in the range of from approximately 300 rotations to approximately 400 rotations of the oblong bearing 34 to produce a single rotation of the inner gear 28 relative to the outer gear 32. Through this configuration, the motor 36 can operate the oblong bearing 34 at a high rate of speed and with minimal force that can be achieved by a much smaller motor 36 than that used in conventional door-assist mechanisms. This low torque 76 and high-speed rotational movement 74 of the oblong bearing 34 produces a much slower rotational movement 74 of the inner gear 28 relative to the outer gear 32, but at a much higher output torque 76 for rotating an output shaft 78 that can be coupled to a hinge plate 80 of the hinge 12 extending between the door frame 22 and the vehicle frame 18. As such, the door operating mechanism 10 can achieve very high torque 76 having drive ratios that can be within a range of from approximately 30:1 to 100:1 or as high as from approximately 300:1 to approximately 400:1.

According to the various embodiments, the high gear ratios provided by the gear interface provides a low-speed rotational movement 74 and high output torque 76 that can result in precise and responsive movements of the door frame 22 and the vehicle door 14 about the hinge 12. Because typical vehicle doors 14 include multiple structural, safety and mechanical features, they have a large mass that can be difficult to rotate, or stop rotation, about the hinge 12 between open and closed positions 122, 124. The high output torque 76 of the gear reduction interface 100 provides sufficient torque 76 to rotate or stop the rotation of the vehicle door 14. Additionally, the low speed output of the gear reduction interface 100 provides for a controlled and precise movement of the vehicle door 14 that can correspond to smooth and quiet operation of the gear reduction interface 100 and the vehicle door 14. In this manner, the opening and closing force 130, 132 of the vehicle door 14 can be precisely controlled.

Referring again to FIGS. 2-7, the door operating mechanism 10 includes the motor 36 having a drive shaft 90 that extends to the oblong bearing 34. It is contemplated that the drive shaft 90 can include a keyed geometry that can include one or more notches 92 to prevent slippage of the drive shaft 90 within the oblong bearing 34. The oblong bearing 34 can include a matching geometry that includes a notch receptacle 94 for accepting the notch 92 defined within the drive shaft 90. The inner gear 28 can be coupled to the hinge plate 80 of the hinge 12, wherein operation of the motor 36 delivers an input rotational force 96 to the hinge plate 80 via the gear reduction interface 100 defined between the oblong bearing 34, the inner gear 28 and the outer gear 32. This configuration minimizes the use of more complex gearing mechanisms that may include planet/sun gears, complex transmission mechanisms, and other gearing mechanisms having multiple components for transferring input rotational force 96 from a motor 36 to an output torque 76 of the output shaft 78. According to the various embodiments, the drive mechanism including the oblong bearing 34, the inner gear 28 and outer gear 32 provides a high output torque 76 through the use of a minimal number of components disposed between the motor 36 and the output shaft 78 of the door operating mechanism 10. Additionally, a minimally sized motor 36 can produce a small input rotational force 96 that can be modulated to a high output torque 76.

Referring again to FIGS. 2-7, it is contemplated that the drive shaft 90 of the door operating mechanism 10 can be coupled to a top portion 110 of the hinge 12, defined by a top hinge plate 112. The top hinge plate 112 is typically disposed in a central position along a height of the vehicle door 14. In this manner, the transfer of output torque 76 from the door operating mechanism 10, through the hinge plate 80 and to the vehicle frame 18 can be positioned at a substantially central portion 114 of the vehicle door 14. It should be contemplated that the door operating mechanism 10 can be disposed at a higher or lower portion of the hinge 12 of the door frame 22 depending upon the needs of the user and the configuration of the particular vehicle door 14. It is further contemplated that the motor 36, the inner gear 28, outer gear 32 and oblong bearing 34 are all disposed within a door cavity 120 defined within the door frame 22. In this manner, the components of the door operating mechanism 10 can be hidden from view during use of the vehicle door 14 in both the open and closed positions 122, 124.

Figure 9:
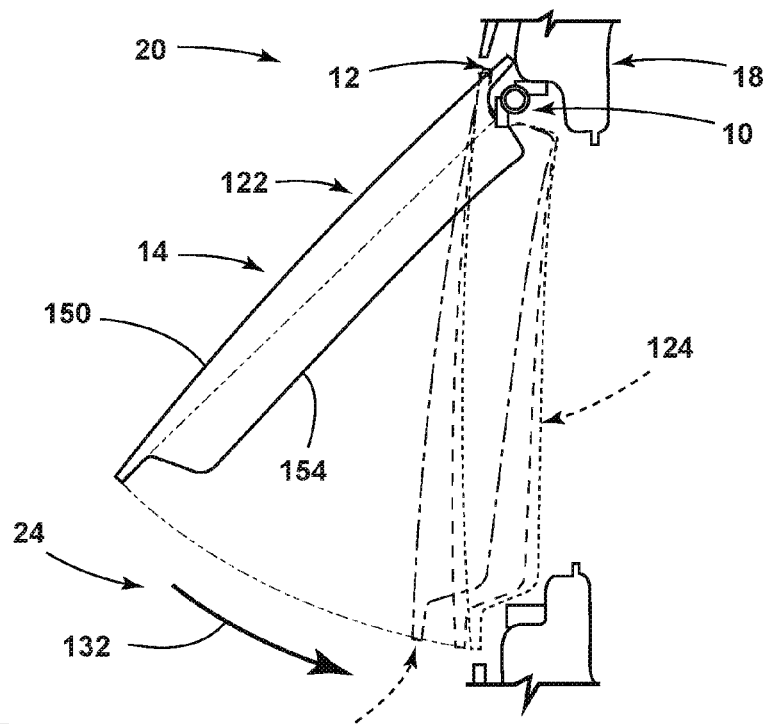
FIG. 9 is a schematic cross-sectional view of a door incorporating an aspect of the door operating mechanism and showing operation of the door between open and closed positions.
Figure 10:
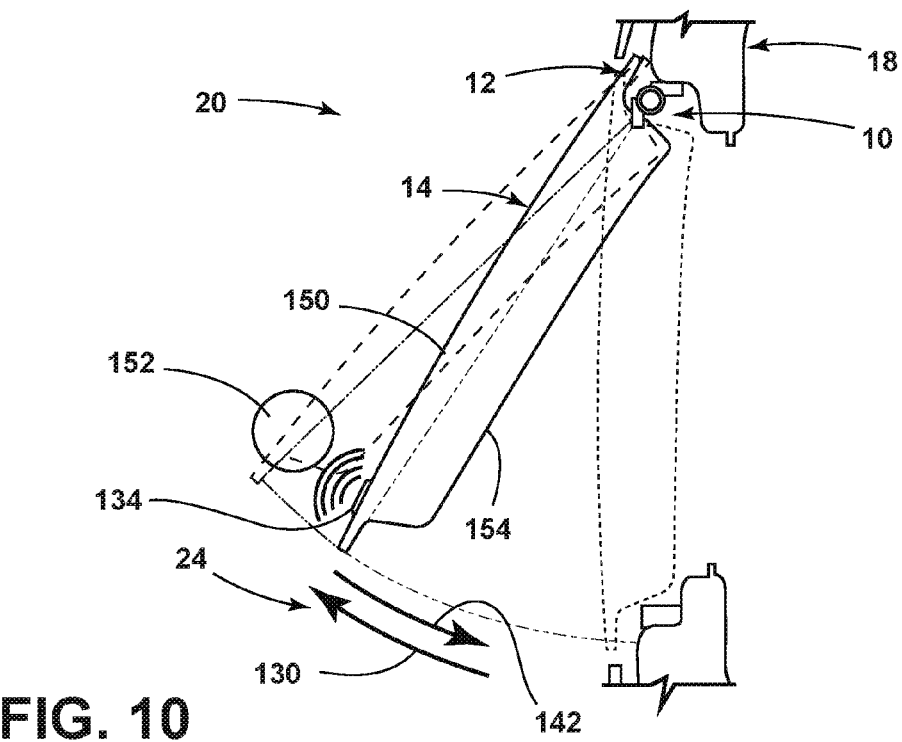
FIG. 10 is a schematic cross-sectional view of the door of FIG. 2 and illustrating the rotation of the door being stopped by the door operating mechanism.

According to the various embodiments, as exemplified in FIGS. 1, 9 and 10, the door operating mechanism 10 can be used for applying an opening force 130 for rotating the vehicle door 14 away from the vehicle frame 18. The door operating mechanism 10 can also be used for applying a closing force 132 to the vehicle door 14 for moving the door frame 22 closer to the vehicle frame 18 toward a closed position 124. These various movements of the door operating mechanism 10 for transferring output torque 76 as a rotational force 24 applied to the door frame 22 relative to the vehicle frame 18 can be incorporated at various points during the rotation of the vehicle door 14 relative to the frame of the vehicle 20. By way of example, and not limitation, the door operating mechanism 10 can be activated to define a soft close feature of the vehicle door 14, such that when the vehicle door 14 is near the closed position 124, the door operating mechanism 10 activates to slowly move the door into the closed position 124 from an ajar position 140. It is also contemplated that the door operating mechanism 10 can include a collision prevention feature of the vehicle door 14. In such an embodiment, a proximity sensor 134 disposed within the vehicle door 14 can alert a processor disposed within the vehicle 20 to activate the door operating mechanism 10. The door operating mechanism 10 can then exert an opposing door-stopping force 142 to the vehicle door 14 that opposes the opening or closing force 132 of the vehicle door 14 to prevent collision of an outer surface 150 of the vehicle door 14 with an obstruction 152 or collision of an inner surface 154 of the vehicle door 14 with the occupant as the vehicle door 14 is moving to the closed position 124. It is also contemplated that the door operating mechanism 10 can be used as an automatic opening or closing feature for automatically rotating the vehicle door 14 between open and closed positions 122, 124. Moreover, it is contemplated that the output torque 76 applied by the door operating mechanism 10 can be an opposing force that at least partially slows or stops the rotation of the door frame 22 relative to the vehicle frame 18. As discussed above, such slowing or stopping of the opening or closing force 132 of the vehicle door 14 can be used to avoid collision with an exterior obstruction 152 or an obstruction 152 between the door frame 22 and the vehicle frame 18, such as an occupant's body part or other object that may be blocking the movement of the vehicle door 14 between open and closed positions 122, 124.

Referring again to FIGS. 2-7, the door operating mechanism 10 for operating the vehicle door 14 can include the motor 36 that is coupled to the gear reduction interface 100 that includes the oblong bearing 34 that slidably rotates within the flexible spline 40. Through this engagement, the oblong bearing 34 rotates within the flexible spline 40 to operate the flexible spline 40 in a meshing engagement with a rigid circular spline 42 defined by the outer gear 32. The hinge plate 80 is configured to be in communication with the flexible spline 40 via the output shaft 78. In this manner, the motor 36 operates the oblong bearing 34 to deliver the input rotational force 96 of the motor 36 to the hinge plate 80, via the gear reduction interface 100. It is contemplated that the first set of cogs 70 can be defined within the outer-facing surface 170 of the flexible spline 40 and the second set of cogs 72 can be defined within an inward-facing surface 172 of the circular spline 42. The first set of cogs 70 and the second set of cogs 72 define a meshing relationship, where the second set of cogs 72 outnumbers, typically slightly, the first set of cogs 70. According to the various embodiments, as the flexible spline 40 moves within the circular spline 42, the circular spline 42 defines a rigid member that is disposed in a fixed position relative to the motor 36. In this manner, operation of the motor 36 serves to rotate the oblong bearing 34 and results in the deformation and simultaneous rotation of the flexible spline 40 relative to the fixed and rigid circular spline 42. Through this system, the gear reduction interface 100 is adapted to be attached to a door frame 22, and the hinge plate 80 is adapted to be attached to the vehicle frame 18. Operation of the motor 36 operates the gear reduction interface 100 and the hinge plate 80 to move the gear reduction interface 100 along with the door frame 22 relative to the vehicle frame 18. Stated another way, operation of the motor 36 serves to move the motor 36 and the gear reduction interface 100 disposed within a housing 180 of the motor 36 about the hinge 12 along with the door frame 22. It is contemplated, in various embodiments, that the motor 36 and the various components of the gear reduction interface 100 can be attached to the vehicle frame 18, such that operation of the door operating mechanism 10 causes rotation of the vehicle door 14 around the hinge 12, while the motor 36 and motor housing 180 remain in a fixed position relative to the vehicle frame 18.

Referring again to FIGS. 1-10, the hinge 12 for the vehicle door 14 can include the motor 36 that is coupled to the door frame 22. The motor 36 is adapted to apply the input rotational force 96 to the door frame 22 to operate the door frame 22 relative to a vehicle frame 18. An oblong bearing 34 is rotationally coupled to the motor 36 and directly receives the input rotational force 96 of the motor 36. A flexible inner gear 28 includes an interior surface 54 that receives at least a portion of the oblong bearing 34. A rigid outer gear 32 includes inner cogs 30 that mesh with the meshing portions 38 of external cogs 26 of the flexible inner gear 28. Rotation of the oblong bearing 34 meshes the external cogs 26 with the inner cogs 30, which results in rotation of the flexible inner gear 28 relative to the rigid outer gear 32. It is contemplated that the flexible inner gear 28 can be coupled with a hinge plate 80 that is attached to the vehicle frame 18. When the motor 36 is activated, the input rotational force 96 of the motor 36 is transferred through the oblong bearing 34, causing rotation of the flexible inner gear 28, that is transferred to the vehicle frame 18. Accordingly, the rotation of the flexible inner gear 28 causes the hinge plate 80 to rotate and, in turn, operate the vehicle door 14 relative to the vehicle frame 18 between the open and closed positions 122, 124.

Referring again to FIGS. 3-6, the sliding engagement between the oblong bearing 34 and the flexible inner gear 28 can be through various sliding mechanisms 190 that can include, but are not limited to, a lubricated sliding interface, cylindrical bearings, spherical bearings, combinations thereof, and other similar sliding mechanisms 190 that allow for the rotational movement 74 of the oblong bearing 34 within the flexible inner gear 28. It is contemplated that the sliding mechanism 190 can include a plurality of bearings disposed along an outer portion of the oblong bearing 36. Operation of the oblong bearing 34 causes rotation of the plurality of bearings along the interior surface 54 of the flexible inner gear 28.

According to the various embodiments, the oblong bearing 34 can be shaped in various oblong configurations that can include, but are not limited to, elliptical, oval, egg-shaped, a rounded-rectangle configuration, irregular, combinations thereof, and other similar oblong configurations that provide for only partial engagement of the flexible inner gear 28 with the rigid outer gear 32. It is contemplated that the rigid outer gear 32 can be made of various rigid materials that can include, but are not limited to, metals, metal alloys, composites, polymers, and other substantially rigid materials that can include inner cogs 30 that can mesh with the external cogs 26 of the flexible inner gear 28.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door operating mechanism for operating a vehicle door comprising:
   a motor coupled to a gear-reduction interface having an oblong bearing that slidably rotates within a flexible spline that operates in a meshing engagement within a circular spline; and
   a hinge plate in communication with the flexible spline, wherein the motor operates the oblong bearing to deliver a rotational force of the motor to the hinge plate via the gear-reduction interface.

2. The door operating mechanism of claim 1, wherein the oblong bearing includes opposing engaging sides that slidably engage an interior surface of the flexible spline, wherein engagement of the opposing engaging sides with the interior surface outwardly deflects corresponding portions of the flexible spline into meshing engagement with the circular spline.

3. The door operating mechanism of claim 1, wherein a first set of cogs are defined within an outer-facing surface of the flexible spline, and wherein a second set of cogs are defined within an inward-facing surface of the circular spline, wherein the first set of cogs and the second set of cogs define a meshing relationship, and wherein the second set of cogs outnumbers the first set of cogs.

4. The door operating mechanism of claim 1, wherein the circular spline is in a fixed position relative to the motor.

5. The door operating mechanism of claim 1, wherein a single rotation of the flexible spline within the circular spline is produced by a predetermined number of rotations of the oblong bearing within the flexible spline, wherein the predetermined number of rotations is within a range of from approximately 300 to approximately 400 rotations of the oblong bearing.

6. The door operating mechanism of claim 1, wherein the gear-reduction interface is adapted to be attached to a door frame, and wherein the hinge plate is adapted to be attached to a vehicle frame, and wherein operation of the motor operates the gear reduction interface and the hinge plate to move the gear reduction interface along with the door frame relative to the vehicle frame.

7. The door operating mechanism of claim 3, wherein the first set of cogs are defined within the outer-facing surface of the flexible spline, and wherein a second set of cogs are defined within an inward-facing surface of the circular spline, wherein the first set of cogs and the second set of cogs define a meshing relationship, and wherein the second set of cogs outnumbers the first set of cogs.

* * * * *